Dec. 12, 1950 K. KONDOR 2,533,588

THREE-DIMENSIONAL LAYOUT EQUIPMENT

Filed Dec. 17, 1945 4 Sheets-Sheet 1

INVENTOR
Karel Kondor
BY Henry J. E. Metzler
Agt.

Dec. 12, 1950 K. KONDOR 2,533,588

THREE-DIMENSIONAL LAYOUT EQUIPMENT

Filed Dec. 17, 1945 4 Sheets-Sheet 2

INVENTOR
Karel Kondor
BY Henry J. E. Metzler
Agt.

THREE-DIMENSIONAL LAYOUT EQUIPMENT

Filed Dec. 17, 1945 4 Sheets-Sheet 3

INVENTOR
Karel Kondor
BY Henry J. E. Metzler
Agt.

THREE-DIMENSIONAL LAYOUT EQUIPMENT

Filed Dec. 17, 1945 4 Sheets-Sheet 4

INVENTOR.
Karel Kondor
BY Henry J. E. Metzler
Agt.

Patented Dec. 12, 1950

2,533,588

UNITED STATES PATENT OFFICE 2,533,588

THREE-DIMENSIONAL LAYOUT EQUIPMENT

Karel Kondor, New York, N. Y.

Application December 17, 1945, Serial No. 635,550

2 Claims. (Cl. 33—174)

This invention relates to improvements in layout devices and, more specifically, it relates to to a new and improved three-dimensional layout equipment.

The assembly of a layout figure necessitates that the layout mechanic execute several squarings, parallelings, measurings and the like in order to determine the run of lines and their dimensions, involving not only extra time for each operation but also a certain amount of measuring mistakes or marking-faults—the so-called "tolerance"—involving each single operation and also involving a repetition or checking of the same.

An object of the present invention is the provision of a device of the character described which constitutes a comparatively simple tool combination or equipment which allows a measuring and laying out in one, two, and three planes or dimensions and which has six scaled surfaces and a form which permits the keeping and the assembly of a great variety of geometrical compositions, so that it lends itself to carry out many of the layout operations which hitherto had to be executed one by one.

The great variety of combinations of forms of measurements provided by this invention permits the solution of a great number of assembled lay-out problems working as a unit, with which the layout men have the choice to execute a series of parallels and/or squares, including measurements and many more as demonstrated later on. The output of combined operations shall be not measured by the contribution of each part of one member or parts of several members of my equipment, but it shall be judged by the power of combination which will multiply the output. The indirect advantages of an accurate and uniform layout may even exceed the time and material saving features of the layout itself, as it will save the extra work of erectors, of the burners, of the welders, of the fitters all standing by to correct faults of inaccurate layout which holds up the fluid continuation for other trades involved.

Another object of the present invention is the provision of a device of the character described which consists of double holder bodies and of single holders provided with scaled surfaces and keeping additionally needed other members of variable form and size—the latter likewise provided with scaled surfaces—enabling the assembly of slidably connected layout units.

Still another object of the present invention is the provision of a device of the character described which can be provided with supplementing variable members in desired numbers having scaled surfaces—whatever their geometrical form may be—but equipped with means for slidably connecting them to one or more parts of the unit, so that this invention provides the means to lay out adjustable parallels, and/or squares, and/or calibrations, and/or offset layout, and/or transfer of parallels from one plane to the other plane, parallel in plane, and/or level—as single layout operations and also a combination of many of the operations together. These named operations and many others can be executed with the choice of surfaces of the unit left or right or up or down to the object.

This invention lends itself to the composition of hundreds of geometrical figures with the means of variability of assembly to lay out three or more adjustable dimensions of multiple parallels and/or squares in adjustable distance from a base line and/or base lines in a single operation of lay-out to copy the uniform way—to lay out pipe offsets, ducts, or other conductors placed with their run in the plane involving lay-outs up to three planes in one operation.

This invention provides easiness, adjustability and accuracy of combinations supplemented with the readability of scales from all angles; visible scale runs all around the members, with the accuracy of marking by means of perpendicularly pointing scale fractions toward the object, with the clear cut readability of calibrations and/or other measurements at the various junctions cutting scale fractions sharply between slidably connected members, with the continuation of scales all around of all members on all planes, with the great number and differentiated runs of scales adapted to cooperate with other corresponding scales on other parts when slidably connected to a unit.

Still another object of the present invention is the provision of a device of the character described which is inexpensive and easy to manufacture, which will satisfy variable needs of various trades, which is handy in use, which can be supplemented with additional parts adapted to the measurement needs of a special trade.

Yet a further object of the present invention is the provision of a device of the character described which can be assembled so as to constitute a drawing device as attachment to a drawing board, which will be explained in detail hereinafter.

A still further object of the present invention is the provision of a device of the character described which serves as a stationary but adjustable layout mechanism on a greater scale, to be used on great industrial layout platforms, as mold lofts in shipyards, and the like.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred forms of the invention have been shown.

In the drawing.

Similar numerals refer to similar parts throughout the several views.

Figures 9, 10, 11, 12:
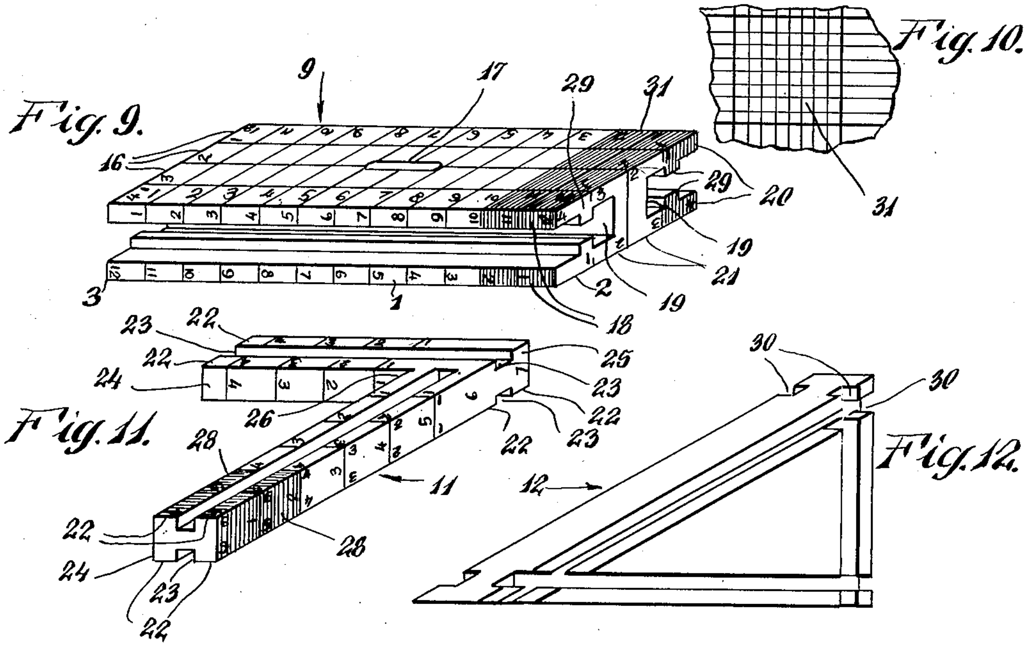
Figure 9 is an oblique view showing a main detail of my device.
Figure 10 is a diagram showing a preferred graduation or scaling arrangement of my device.
Figure 11 is an oblique view showing another detail of my device.
Figure 12 is an oblique view showing still another detail of my device.
Figures 13, 14:
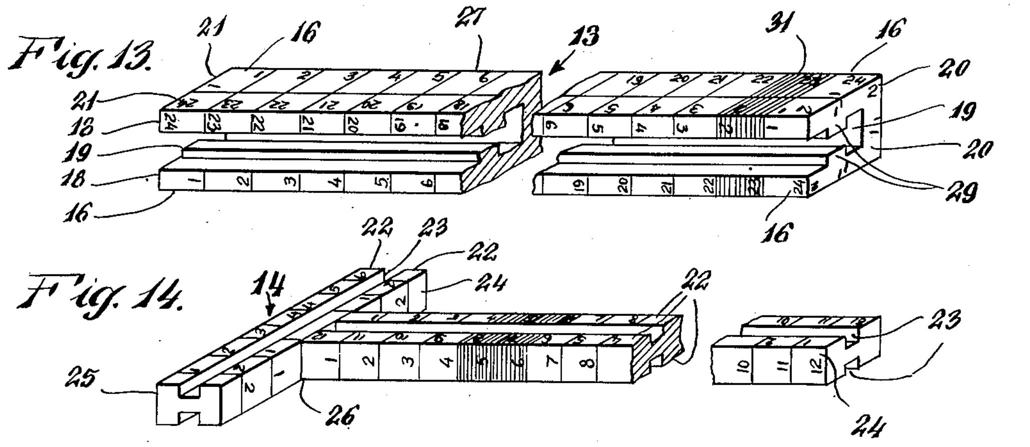
Figure 13 is an oblique view showing a further detail of my device.
Figure 14 is an oblique view showing still a further detail of my device.

Referring first to the details or parts of my new and improved equipment as illustrated in Figures 9 to 15 inclusive, the numeral 9 denotes a double holder consisting of a broad elongated bar which is rectangular in cross-section and whose surfaces are mechanically accurate. All six surfaces of the bar 9 are provided with graduations of equal scale. The larger sides of the bar 9 are preferably scaled both longitudinally and transversely as is illustrated in Fig. 10, which shows a fraction of the scaling arrangement drawn at an enlarged scale. The graduations of scales on all surfaces of the double holder or bar 9 run from edge to edge of each surface, continuing into the scale fractions of the adjoining planes. The double holder 9 has sixteen scale runs on all six surfaces, namely four longitudinal flat plane scales 16 with transversely running scale fractions, on one large side four flat plane scales 21 with longitudinally running scale fractions on the opposite side, four plane scales 18 on the two longitudinal narrow sides, and four plane scales 20 on the two short narrow sides. One or more fluid levels 17 are embedded in the bar 9 so that they can be used as spirit levels on the large sides of the bar 9.

Longitudinal grooves 19 are extended through the longitudinal smaller sides of the bar 9, and these grooves are preferably provided with ribs 29, so that the grooves are substantially I-shaped in cross-section and are adapted to receive correspondingly shaped parts of other members of the equipment.

The double holder 9 alone is an independently working measurer, square, parallel device, level both in plane and in linear use with the aid of its "own surfaces" and the combination of numerous scales on all surfaces.

A portion of the large surfaces of the bar or double holder 9 is preferably scaled cross-wise as indicated at 31 in Figure 9, and in an enlarged scale in Figure 10.

One of the parts or members used in connection with my improved implement is the L angle 11 (Figure 11) the legs of which are male protruded shaped and adapted to fit tightly and entirely into the grooves 19 of the double holder 9. To permit the drawing of continuous lines, when the male members are slidably connected, inside side plane scales 24 and outside side plane scales 25 of the male members of part 11 are flush with the side plane scales 18 (Fig. 9) of holder 9.

The offsets or ribs 29 in the grooves 19 of the dobule holder 9 engage the grooves 23 of the legs of the male member 11. As the offset 29 is in the center of each groove 19, the male members of part 11 can be slidably connected with their ends straight or reversed. This means there are possible five different forms of entry into one entrance, but as there are four entrances in a double holder 9, the number of variety in 4 entrances is 20, enabling the composition of numerous geometrical forms between male and female members of an assembled unit (see Fig. 5).

Figure 15:
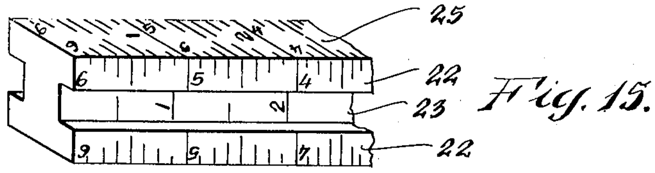
Figure 15 is an oblique view showing a part of the details of Figs. 11 and 14 drawn on an enlarged scale.

The shanks or legs of the L-angle 11 and the other male members of my new and improved equipment have mechanically square surfaces and lines and are covered with 16 linear scale runs with perpendicular fractions all around of each leg, as illustrated by Fig. 15. A portion of the scale run is indicated in Fig. 11 at 28. The scale fractions point perpendicularly toward the material to be measured, or marked. It transfers parallel from plane to plane as will be explained more in detail hereinafter.

The two side plane scales 24 are numbered beginning at the inner corner 26, which is the zero point to count the square or parallel when the leg of a male member is slidably connected into a groove 19.

The two side plane scales 25 (Figs. 5, 11 and 15) have three rows of scales; the two scales on the edge of each shank count from the inner corner, the center scale from the end of the shank.

The four groove scales 23 are numbered from the end of the shank, as may be seen more distinctly in the enlarged Fig. 15.

The eight flat scale runs 22 of the shanks of the male members count from the inner corner.

Opposite and straight running scales on different sides and surfaces of the shanks enable the counting of measurements in relation to female members scales. Whatever shank is used toward the material, a scale is at hand running along the suitable way for the lay-out operation involved.

Another part or member used in connection with my new and improved three-dimensional layout equipment is a triangle 12 (Fig. 12) with male protruded shaped sides and the grooves 30 fitting into the grooves 19 of a double holder 9. It is usable without connecting it into the grooves 19, in which case it can be used as an ordinary triangle in a well known manner. The shanks of the triangle 12 can be without graduations, as shown, or they can be provided with graduations and scales as are the shanks of the member 11 previously referred to.

Still another part or member used in connection with my new and improved three-dimensional layout equipment is the single holder 13 (Fig. 13) which has only one female protruded I-shaped groove 19, of the same form as that of the double holder 9. Male protruded shaped members as the L-angle 11, a T square 14, a triangle 12, are engaged the same way, therefore its utilization is similar to that of the double holder 9. The part 13 can be used as a square or parallel device being scaled as the double holder 9. Its scales and parts are numbered with the same item numbers as the double holder 9, with the exception of the backs 27. The back is scaled as the flat plane scales 16 and 21, which scale runs are shown in Fig. 10. A portion of scale run as per Fig. 10 is illustrated on the single holder at 31.

While the grooves 19 of the parts 9 and 13 (Figs. 9 and 13) are shown without graduations, it will be obvious that these grooves can also be provided with scales or graduations similar to the scales 23 of Fig. 15, if such additional scaling should be desirable for the specific purpose for which the device is intended.

A further part or member used in connection with my new and improved three-dimensional layout equipment is the T-square 14 (Fig. 14) which has male protruded shaped shanks identical in function to the L-angles 11. Its scales are made up according to the principles of the L-angle 11. It is practical where two holders have to be jointed. In this case one short shank of the part 14 engages one groove 19 of one holder while the other short shank of the part 14 engages a second holder, so that two holders are slidably connected to one continuous length. The scalings or graduations on the shanks of the T-square 14 can be arranged in substantially the same manner shown in Figs. 11, 13, and 15.

Having thus described the various parts or members or my new and improved three-dimensional layout equipment, I shall now proceed in describing its use in connection with various examples illustrated in Figs. 1 to 8 inclusive.

Figures 1, 2, 3, 4:
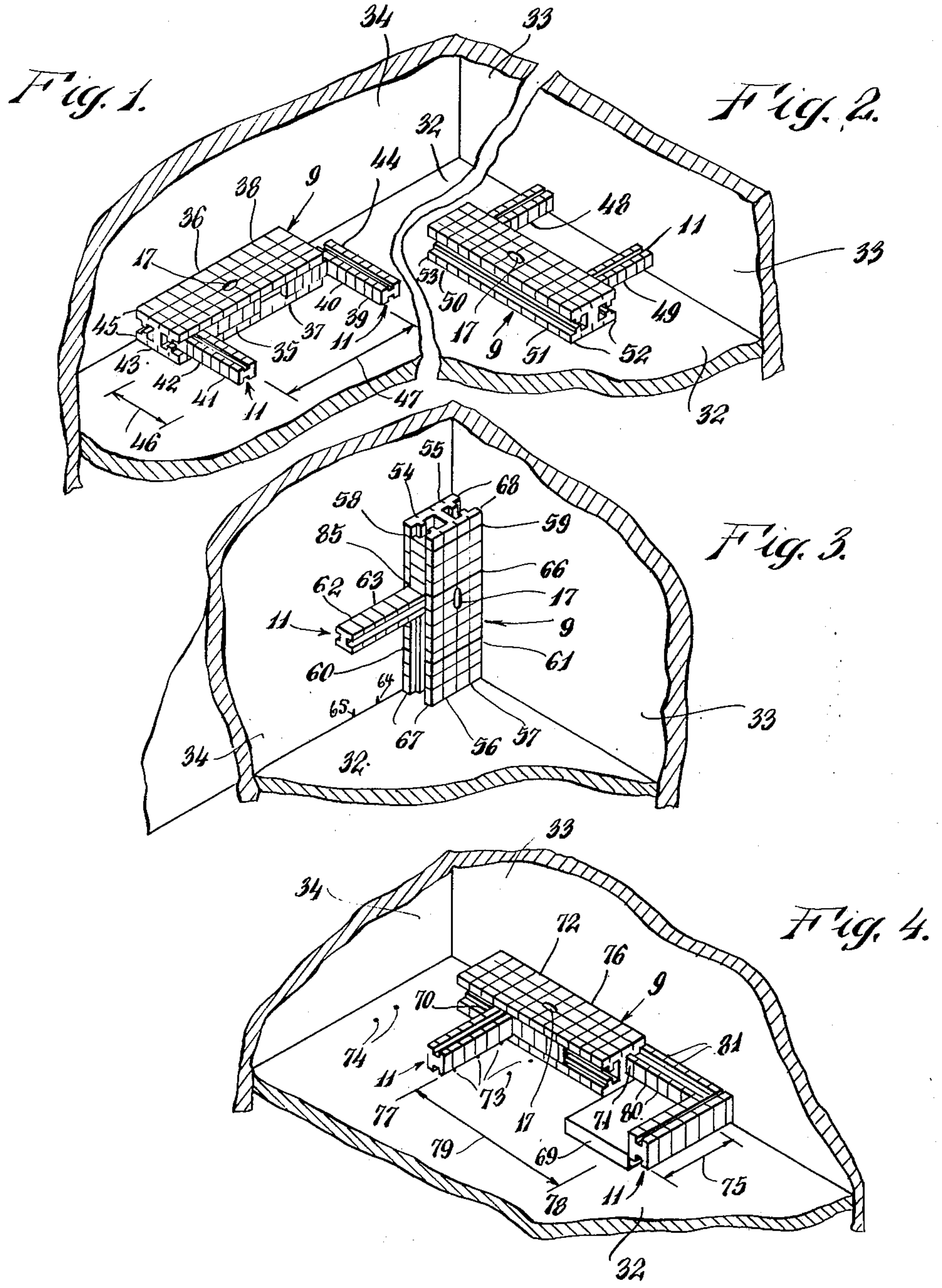
Figure 1 is an isometric view showing a preferred embodiment of my invention as it appears when it is being used for a certain purpose as will be explained in detail hereinafter.
Figure 2 is an isometric view showing a preferred embodiment of my invention as it appears when it is being used for another purpose as will be explained in detail hereinafter.
Figure 3 is an isometric view showing a preferred embodiment of my invention as it appears when it is being used for still another purpose as will be explained in detail hereinafter.
Figure 4 is an isometric view showing a preferred embodiment of my invention as it appears when it is being used for again another purpose as will be explained in detail hereinafter.

Figure 1 shows a "unit" of my equipment composed of one double holder 9 and of two L-angles 11, kept with one of its surfaces against a vertical plane 34 in flat position.

With its own surfaces it squares and parallels the two planes 45. Its positioning is the security of lay-out measurements. The unit transfers parallels between vertical and flat plane (see transfer points 35, 36, 37, 38). The double holder 9 alone enables the selection of parallel points 43 and 44.

Simultaneously it levels with the aid of the leveling device 17. Rectangles adjustable as wanted can be laid out by selection of distances on the two legs of 11, in any wanted square or parallel relation to the plane 39, 40, 41, 42. When a longer longitudinal distance is needed the shanks are slid out to both sides, in which case the scales of the L-angle 11 take over the rôle of the side scale 18 of the holder 9. If a longer square to plane 34 is needed, a T square 14 can be engaged with the holder 9, and if that is not sufficient a T-square 14 and a single holder 13 will quintuple the distance shown here.

If the measuring points nearer to the plane 34 are needed the unit is turned over as per Fig. 2.

Fig. 2 illustrates a double holder with two L-angles 11, each of which has one of its shanks inserted into a groove of the holder 9 while the other shanks, which are of equal length, are kept against the transverse plane 33. The square surface of the end of the two shanks will establish the reliable parallel, also the square to plane 32, on which the unit is positioned.

The two equal shanks establish the standard distance which may serve as an auxiliary parallel as per 52 and 53. If other adjustable distances are needed in any parallel and/or two laterally square distances from plane 33, the measurements can be selected on the two laterally equal shanks as shown at 48 and 49. Such or any other measurements in relation to the plane 33 can be also transferred from 48 and 49 or from any other points to this side of the double holder 9 as per 50 and 51, by following the scales on the flat surface of the double holder 9 all around its surfaces. In this position the two L's are in the back groove of the double holder 9. If space is more limited the L's can be slidably connected into the front groove which will bring nearer the double holder 9 to the transverse plane 33, thus enabling the layouts of parallels and squares to the transverse plane 33 when the beams, stringers, or other obstacles (not shown) are hindering the placement of the unit.

Another example of the utilization of my device is shown in the example illustrated in Fig. 3 where it will be seen that a double holder 9 is in engagement with an L-angle 11. In this case the unit is in an upright position and the double holder 9 rests against three planes, with its three squaring and/or paralleling surfaces at 67 and 68, establishing a reliable layout position.

The up and down sliding L angle 11 may establish any wanted parallel to the plane 32, which is one of the principal paralleling and squaring features of the system. The bottom end plane of the holder 9 is placed against any plane in any wanted position or against a base line, the sliding L 11 does the paralleling to it, reading the distance up or down at 85 and reading the distance side-wise at 62, 63.

By adjusting the L angle 11 in the slot 19 of part 9 up and down and selecting measuring points side-wise on the out sticking shank of the L angle 11, rectangles or any other lay-out points may be established as illustrated by the four measuring points 62, 63, 64, 65.

The named points are transferable from plane 34 into plane 33 as per 61 and 66.

The double holder 9 independently transfers parallels from plane to plane at 54 and 55 to points 56 and 57, using the scales of the end plane and the flat plane of the holder 9. Side-wise the measuring points 58 and 60 are transferred to plane 33 as per measuring points 61 and 59.

According to the example shown in Figure 4 one double holder 9 is engaged with two L-angles 11 in flat position on a flat horizontal against the transverse plane 33.

Parallels are transferred from the points 80 to 81 with the aid of the shank scales of the L-angles 11 all around the shanks.

The L-angle 11 at line 77 can be moved up and down, even can reach the plane 34 and transfer measuring points to that plane.

71 is the reading point for calibration of the flat bar, while the numeral 70 denotes the reading point for the L-angle 11 on the line 77. The numeral 79 denotes a calibrated distance between two shanks of the L-angles 11, and the numeral 75 denotes the distance on the lower shank of the L-angle 11 and shows further simultaneous utilizations of the unit.

By turning the unit with any of its plane surfaces, by changing the grooves for connecting and the like the variations of possible utilizations are very numerous.

Figure 5:
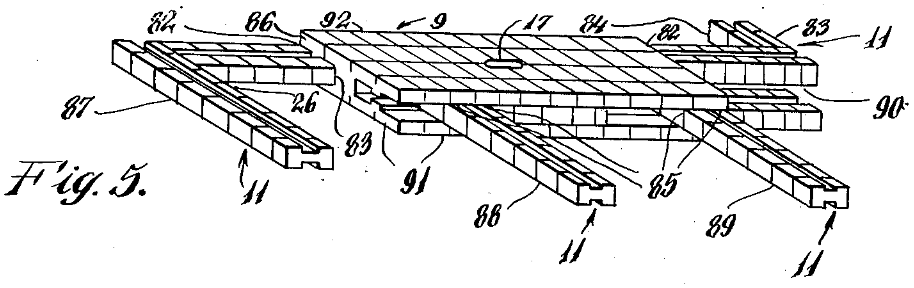
Figure 5 is an oblique view showing a preferred embodiment of my invention in combination with various other parts of the equipment.

Figure 5 is an illustration of connecting of four L-angles 11 into one double holder 9 with different ends and sides of L-angles 11 slid into the four entrances of the double holders 9.

It illustrates that an L-angle 11 (or a T square 14 or other male shaped shanks) is able to enter with one of its shanks one groove entrance of one L-angle 11 plus up and down or in five different ways. To this is to be added that there are four entrances in a double holder 9, which multiplies the entry to 20 different positions for one L-angle 11. Using 2 or 3 or 4 shanks of different members of the variability of the geometrical figures to be composed becomes apparent.

The various shanks of L-angles 11 sticking out of the double holder 9 lend themselves to various inside and or outside calibrations or the combinations of both using two different grooves at a time. With many shanks at work in different grooves the number and variety of combinations goes into the hundreds.

In Fig. 5, at 82 on the left side, the end plane of the holder 9 composes the offset 86, which is a calibrator in combination with a shank for outside or inside measurements. The same offset 86 is a marker with an L-angle 11 sliding the latter out to the wanted distance, reading it at 82 and 83, and using the inner corner 26 as keeper of the pencil or the knife.

The numerals 82 and 83 denote the connecting junctions and reading points of lengthwise measurings, at which junctions clear cut readings can be made from all angles and sides.

Another such junction of the side plane scale of the double holder 9 is illustrated at 85, where the four edges of one shank constitute four reading points (two up and two down).

The perpendicularly pointing scales toward the material to be laid out are denoted 84, 87, 88, 89, 90, 83, for the L-angle 11 and at 91 and 92 for the holder 9.

Wherever the mechanic stands to see, wherever the positioning of the unit is needed, whatever scale direction, whatever combination with other parts are needed, there is a scale visible in a convenient position.

Figure 6:
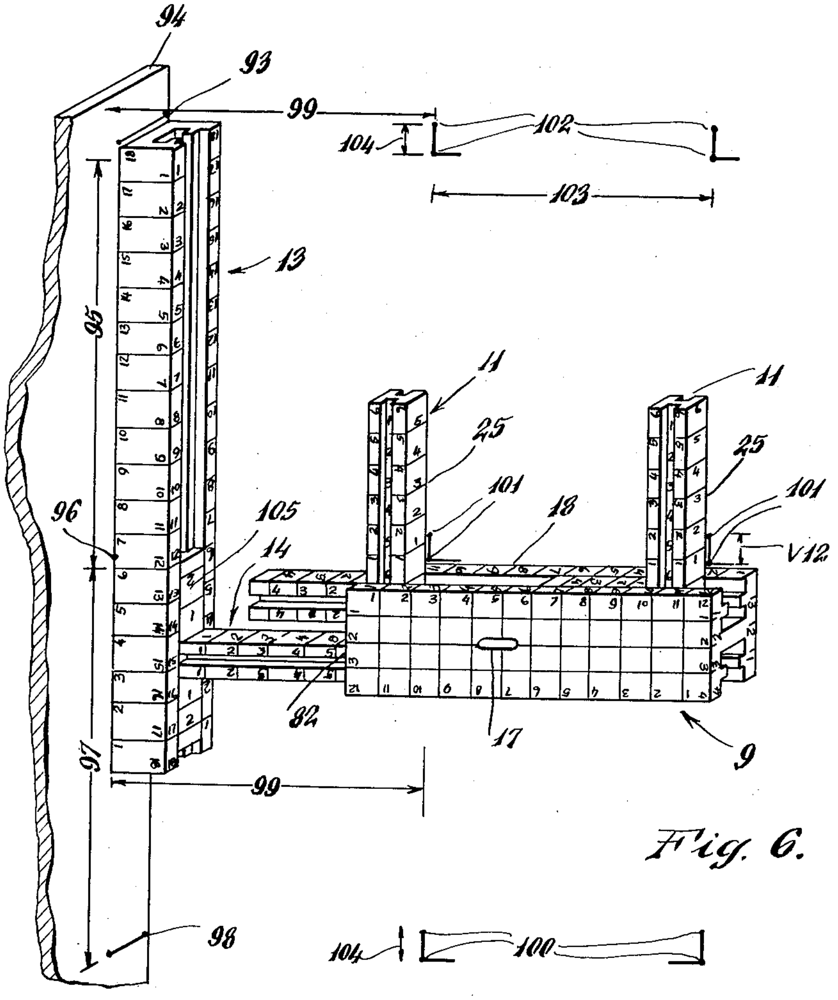
Figure 6 is an oblique view showing a preferred embodiment of my invention as it appears when it is being used for another certain purpose as will be explained in detail hereinafter.

The example illustrated in Fig. 6 relates to a preassembled unit composed of one single holder 13, one T-square 14, one double holder 9, and two L-angles 11.

This unit is assembled for the special purpose of copying the welding locations 100, 101, 102 of the two legged cable carrying stools of a long cable run of a hundred stools, to be marked overhead parallel to a beam 94 (cable run) with legs square to said beam.

Before climbing the stage (not shown), the mechanic adjusts the unit to dimensions of blue print and local conditions on board viz. distance 99 between cable run (welding locations 100, 101 and 102) and the beam 94, distance 95 or 96 between cable stools in the run (between welding locations 102 and 101), distance between two legs of a cable stool 103, and the distance of width of one leg 104 (really two distances for two legs of a cable stool).

Ordinarily this means five distances and various squares and parallels for one single cable stool to be made up one by one, as there is no room between obstructing beams to use a continuous chalk line.

After climbing the stage with the adjusted unit the mechanic marks one check line for each copying as marked at 93 and draws the welding location at 11. The square unit establishes on beam 94 the right reliable position, and the operation is repeated as often as wanted, with reliable uniform measurements for the whole run.

For the next layout of a similar cable run the unit may be adjusted to the desired dimensions.

Figures 7, 8:
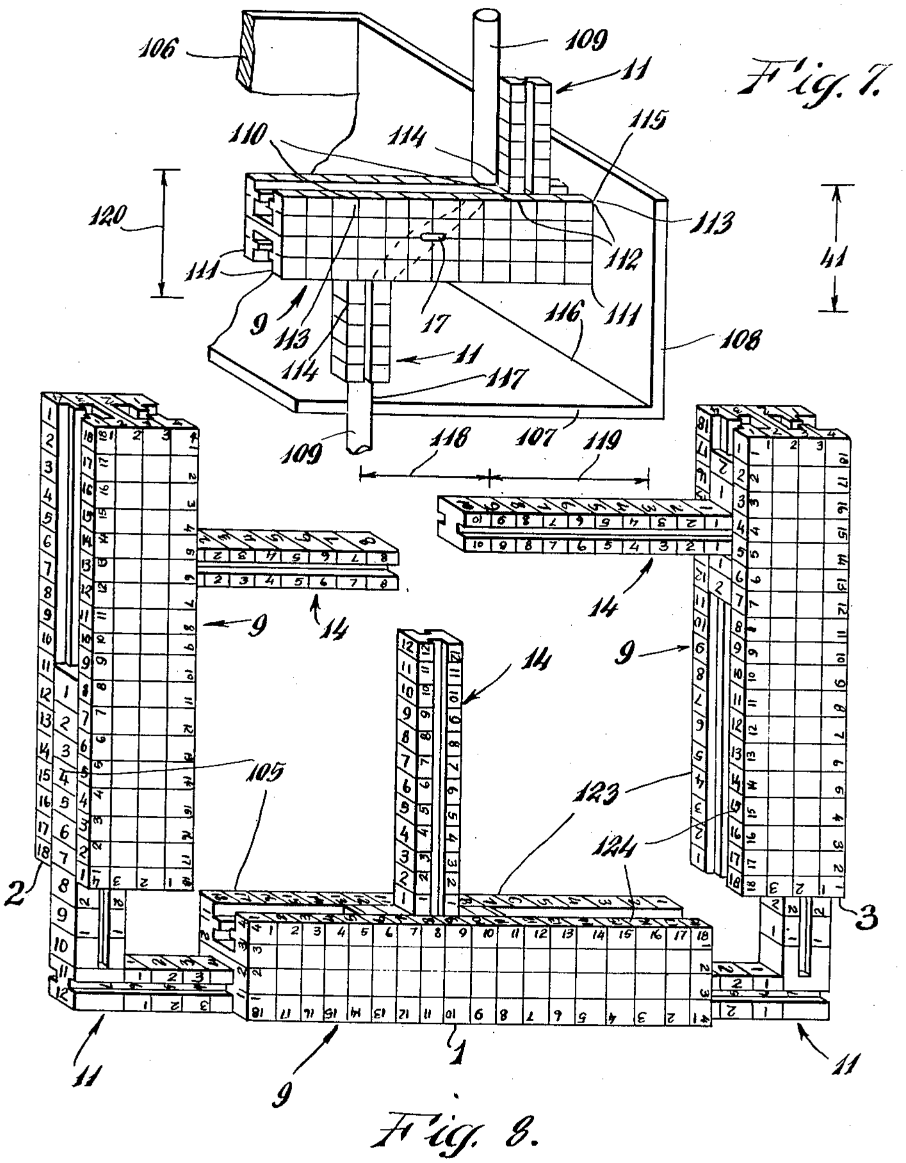
Figure 7 is an oblique view showing a preferred embodiment of my invention as it appears when it is being used for still a different purpose as will be explained in detail hereinafter.
Figure 8 is an oblique view showing a preferred embodiment of my invention as it appears when it is being used for an attachment to a drawing board.

The example illustrated in Figure 7 has reference to a layout unit made up of one double holder 9 and two L-angles 11, one leg of each in a different groove, one up one down positioned with end plane of holder against a transverse plane 108, with sideplanes of a double holder 9 up parallel to the vertical plane 106, above the flat plane 107.

Otherwise the unit is in the air, to layout in the plane the pipe run 109 with a pipe offset behind the unit as per dotted line to determine also the location of the hole 117 in the deck (flat plan 107).

The lay-out operation involves all three planes mentioned and is carried out in the following manner:

For this lay-out in the air, the unit positions itself squarely and parallel at two ends at 111 and at 115. The level 17 aids thereto. Simultaneously the two straight pipe run distances from the transverse plane can be read at 113 for the lower straight run and 112 for the upper straight run. When the pipe 109 is laid the two reliably positioned up down shanks of the L-angle 11 will check the up and down run of pipe 109; this means two up and down runs for the lower and upper straight runs of pipe 109.

The numeral 114 denotes a reading on the shanks of the L-angles 11 as distance 120, the length of the pipe offset (which runs up and down).

At 115 and 111 are two check lines in order to mark the exact position of the unit.

To determine the location of hole at 117, the unit is slid down toward 116 until the lower shank of L-angle 11 hits the deck 107 at 117, where lines can be laid out for the pipe hole.

This kind of lay-out is useful to determine the exact location of an offset run, to make way for other runs, or to copy the run of a pipe to be replaced, or to rearrange the run where other pipes or obstacles may demand the determination of the exact location. With this unit an inspector may check runs of many pipes in a short time.

The Figure 8 illustrates an assembly of three double holders 9, two L-angles 11 and three T-squares 14, all slidably connected together for being used as a drawing board supplement or on a greater scale as lay-out mechanism for great industrial lay-out or mold loft platforms.

The two outside grooves 19 of the double holders 9 with two L-angles 11 slidably connected into four entrances provide the adjustability to the edges of a board.

In this case the lower edge portions 1, 2, 3 of the holders 9 can rest against the edges of a drawing board (not shown). The three inward pointing legs of the three T-squares 14 sliding in the inward slots 19 of three double holders 9, constitute the movable, measuring distance adjustors in every square and/or parallel direction on the surface of the drawing board, or the lay-out platform on the ship yard.

In case of industrial platform use it will be possible to connect a pre-assembled "copying unit" as illustrated with Fig. 6 to any one of the shanks of the square on Fig. 8. Suppose a large bulkhead or plate must be provided with the welding locations of 20 identical lay-out forms, the lay-out man pre-assembles a figure as that of Fig. 6 and telescopes the single holder 13 of the latter of Fig. 6 to one of the shanks of the Figure 8.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

Having thus described my invention, what I claim and desire to secure by Letters Patent in the United States is:

1. The combination, in a three-dimensional layout device, of at least one elongated main bar which is rectangular in cross-section and which has longitudinal grooves in both of its smaller sides; with at least one auxiliary elongated bar which is of a lesser width than said main bar and which has a longitudinal groove in one of its narrow sides and at least one triangle, a plurality of L-shaped angular members, and a plurality of T-shaped members, the shanks of said angular and of said T-shaped members as well as those of said triangle being adapted to slide in the grooves of said bars, and said bars as well as said triangle and said angular and said T-shaped members having equally scaled graduations on their outer sides and in their grooves.

2. In a three-dimensional lay-out device, the combination of at least one elongated main bar which is rectangular in cross-section and which has I-shaped grooves extending through both of its smaller sides; with at least one auxiliary elongated bar which is of a lesser width than said main bar and has an I-shaped groove in one of its narrow sides; and at least one triangle, a plurality of L-shaped angular members, and a plurality of T-shaped members, the shanks of said angular and of said T-shaped members as well as those of said triangle being adapted to fit snugly and to slide in the grooves of said bars, and said bars as well as said triangle and said angular and said T-shaped members having equally scaled graduations on their outer sides and in their grooves.

KAREL KONDOR.

REFERENCES CITED

The following references are of record in the file of this patent:

UNITED STATES PATENTS

| Number | Name | Date |
|---|---|---|
| 488,327 | Brown | Dec. 20, 1892 |
| 497,165 | Cone | May 9, 1893 |
| 681,551 | Hulse, et al. | Aug. 27, 1901 |
| 764,163 | Taplin | July 5, 1904 |
| 833,917 | Burchardi | Oct. 23, 1906 |
| 1,092,737 | Mennis | Apr. 7, 1914 |
| 1,220,664 | Maxwell | Mar. 27, 1917 |
| 1,258,536 | Conner | Mar. 5, 1918 |
| 2,053,810 | Bisel | Sept. 8, 1936 |
| 2,307,584 | Harris | Jan. 5, 1943 |

FOREIGN PATENTS

| Number | Country | Date |
|---|---|---|
| 16,719 | Great Britain | 1910 |